(12) United States Patent
Ghiselli et al.

(10) Patent No.: US 9,434,140 B2
(45) Date of Patent: Sep. 6, 2016

(54) GLUING DEVICE FOR GLUING THE TAIL OF A LOG AND RELATED METHOD

(71) Applicant: FABIO PERINI S.P.A., Lucca (IT)

(72) Inventors: Davide Ghiselli, Lucca (IT); Matteo Borselli, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 172 days.

(21) Appl. No.: 14/368,840

(22) PCT Filed: Dec. 27, 2012

(86) PCT No.: PCT/EP2012/076921
§ 371 (c)(1),
(2) Date: Jun. 26, 2014

(87) PCT Pub. No.: WO2013/098304
PCT Pub. Date: Jul. 4, 2013

(65) Prior Publication Data
US 2015/0013887 A1 Jan. 15, 2015

(30) Foreign Application Priority Data
Dec. 29, 2011 (IT) .................. FI2011A0276

(51) Int. Cl.
*B65H 75/28* (2006.01)
*B65H 19/29* (2006.01)
*B32B 37/00* (2006.01)
*B32B 37/12* (2006.01)
*B32B 37/20* (2006.01)

(52) U.S. Cl.
CPC ....... *B32B 37/0053* (2013.01); *B32B 37/1284* (2013.01); *B32B 37/20* (2013.01); *B65H 19/29* (2013.01); *B32B 2317/12* (2013.01); *B65H 75/28* (2013.01); *B65H 75/285* (2013.01); *B65H 2301/41445* (2013.01); *B65H 2301/414421* (2013.01); *B65H 2301/414436* (2013.01); *Y10T 156/14* (2015.01)

(58) Field of Classification Search
CPC .... B65H 19/29; B65H 75/28; B65H 75/285; B65H 2301/414421; B65H 2301/414436; B65H 2301/414443; B65H 2301/414445
USPC ....... 242/520–548.4; 156/184, 185, 187, 191
See application file for complete search history.

(56) References Cited

U.S. PATENT DOCUMENTS

| | | | |
|---|---|---|---|
| 3,470,052 A | 9/1969 | Herman | |
| 5,242,525 A | 9/1993 | Biagiotti | |
| 5,681,421 A | 10/1997 | Biagiotti | |
| 6,372,064 B1 * | 4/2002 | Butterworth | B65H 19/29 156/187 |

(Continued)

FOREIGN PATENT DOCUMENTS

| CN | 2715982 Y | 8/2005 |
|---|---|---|
| DE | 102007008996 A1 | 8/2008 |

*Primary Examiner* — Carson Gross
(74) *Attorney, Agent, or Firm* — Breiner & Breiner, L.L.C.

(57) ABSTRACT

A gluing device including a guide roller to guide the tail of the log; on the guide roller, retaining elements to engage and retain the tail on the guide roller; a gluing member, to apply a glue to the tail retained on the guide roller. There are also provided embossing members, arranged and controlled to emboss a portion of the tail of the log. The gluing member applies the glue to embossing protrusions formed by the embossing members.

14 Claims, 17 Drawing Sheets

(56) References Cited

U.S. PATENT DOCUMENTS

| | | | |
|---|---|---|---|
| 7,513,285 B2 * | 4/2009 | Gambini | B65H 19/29 156/184 |
| 2003/0001042 A1 | 1/2003 | Betti et al. | |
| 2006/0217831 A1 * | 9/2006 | Butterworth | B65H 26/00 700/126 |
| 2007/0102552 A1 | 5/2007 | Gambini | |

* cited by examiner

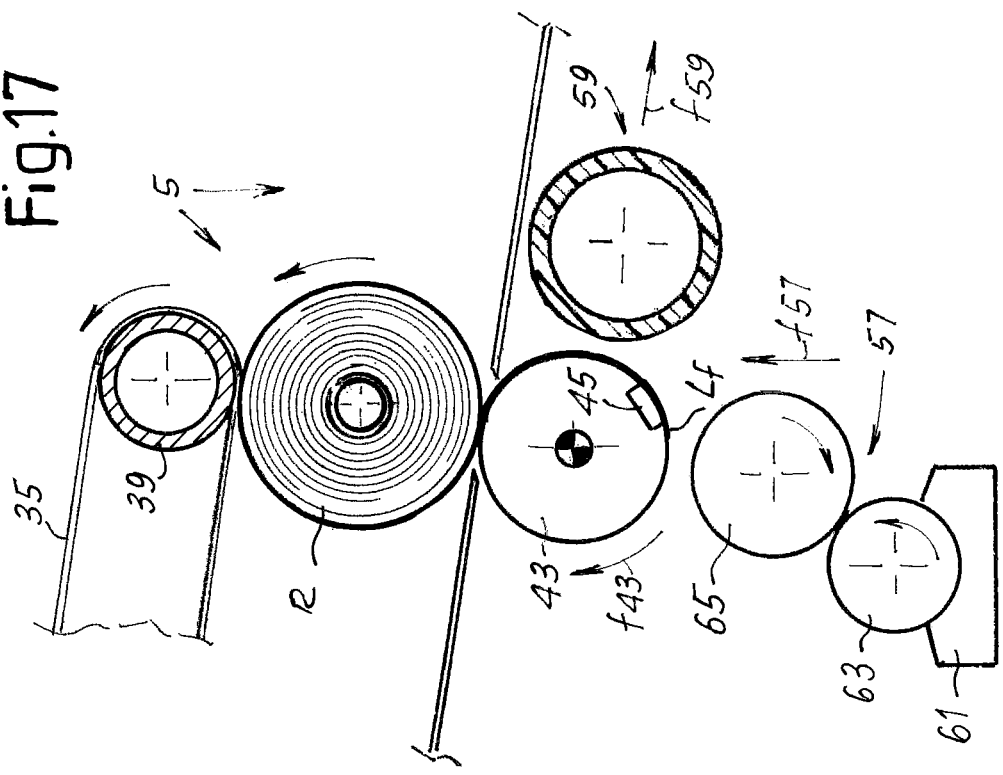
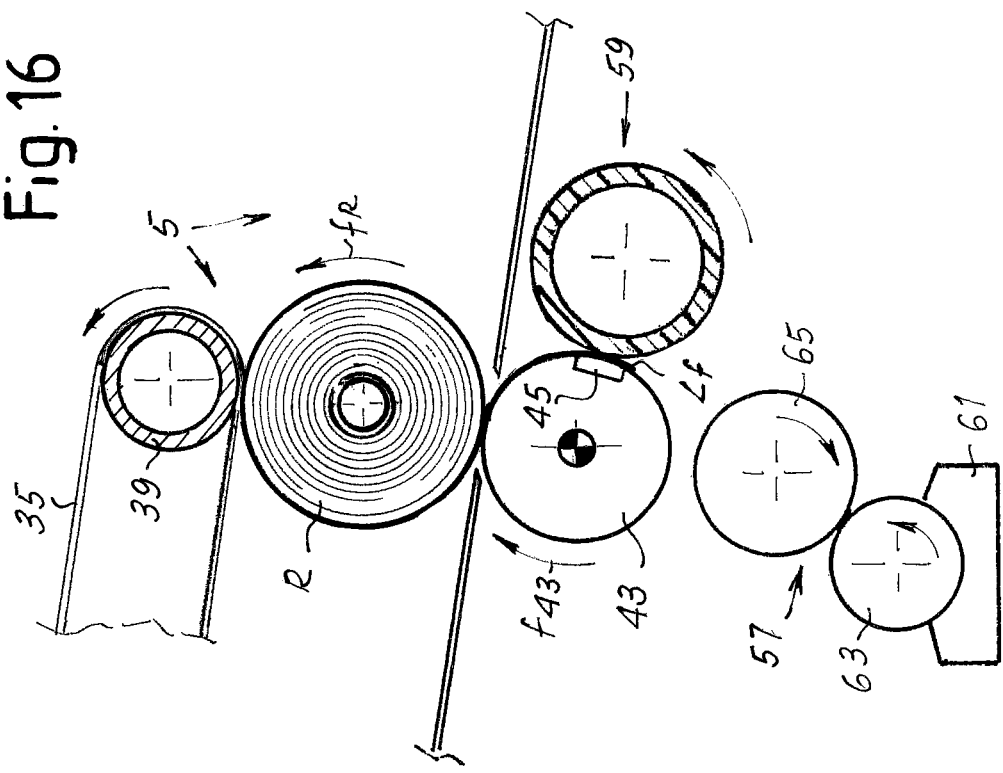

GLUING DEVICE FOR GLUING THE TAIL OF A LOG AND RELATED METHOD

TECHNICAL FIELD

The present invention relates to machines and devices for converting web materials into logs. More in particular, the present invention relates to improvements to machines for sealing the tail of a log of web material, for example a cellulose material, such as a web of tissue paper for producing logs of toilet paper, kitchen towels or the like.

The invention also relates to a method of gluing the tail of a log of wound web material, for example tissue paper.

STATE OF THE ART

In the production of logs, for example logs of tissue paper, such as kitchen towels, toilet paper and the like, the web material is unwound from reels of large diameter coming from a paper mill and rewound into logs of smaller diameter, which are subsequently cut to form rolls destined for packaging and sale. In some cases, the web material is cut during unwinding of the reel and rewound directly into logs of smaller diameters and axial dimensions. In some cases, several plies coming from several reels of large diameter are combined and rewound into logs of smaller diameter.

At the end of winding of the logs, the tail thereof must be fastened to the outer surface of the log, for example by gluing, in order to prevent unwinding of the web material during the subsequent operations until final packaging.

In the specific field of tissue paper converting, gluing devices have been developed wherein each log is handled to identify the position of the tail of the log and wherein the tail is subsequently unwound, glue is applied (to the tail or to a portion of the cylindrical surface of the log still wound) and the tail is then closed again, making the tail adhere to the outer surface of the log.

An example of a gluing device of this type is described in U.S. Pat. No. 5,242,525 and in U.S. Pat. No. 5,681,421.

The tissue paper logs are frequently customized by the manufacturer, by applying a logo, a decoration or the like thereto. In some cases the manufacturer's logo, brand or decoration is applied only to the packaging material, for example a plastic film inside which one or more rolls are packaged.

There have also been developed gluing machines or devices wherein an attempt has been made to apply the glue in a pattern, so as to reproduce on the glued edge of the log a writing, a logo or in any case a general information, for example identifying the manufacturer, the type of product or the like. An example of a gluing device of this type is disclosed in EP 1652804. This prior art device comprises a pair of superimposed conveyors, defining a feed path of a log toward a gluing station. In the gluing station a suction roller is provided that unwinds the tail of the log and moves it in front of a gluing member. To apply the glue according to a pattern, the gluing member is configured as a rotating pad that picks up glue in a container and, by means of a rotation movement, applies glue to the tail which is retained on the unwinding roller. The pad is designed according to a pattern, i.e. it has relief areas that reproduce the writing or the logo to be generated on the tail of the log. Consequently, the pad acts as a sort of "stamp". The relief pattern provided on the pad coincides with a corresponding negative pattern produced on the surface of the unwinding roller.

This device does not allow satisfactory results to be achieved as it is unable to reproduce sharp patterns, logos or writing due to the manner in which the glue is applied to the tail. Moreover, the glue pick-up system is designed in such a manner that there is a risk of glue being sprayed as a result of centrifugal force, with consequent soiling of the machine and the risk of damage to the web material.

There is therefore the need to provide a device and a method for sealing the tail of a log, which are more efficient and overcome the problems of prior art.

SUMMARY OF THE INVENTION

To obtain improved gluing with controlled glue distribution, for example to produce a logo, a pattern or writing by means of the glue, e.g. colored glue, it is provided to emboss at least a portion of the tail of the log to be glued and to apply the glue to the embossing protuberances. In this way, very accurate and clean distribution of the glue is obtained, using a very simple glue application system, for example a smooth cliché roller.

According to one embodiment, for this purpose a gluing device is provided for gluing the tail of a log of web material, comprising: a guide roller to guide the tail of the log; on the guide roller, retaining elements to engage and retain the tail on the guide roller; a gluing member, to apply a glue to the tail retained on said guide roller; embossing members to emboss a portion of the tail of the log. The gluing member applies the glue to embossing protrusions formed by said embossing members.

The embossing members can advantageously comprise embossing protuberances on the guide roller and a pressure member cooperating with the embossing protuberances. In some embodiments the pressure member comprises a pressing element rotating about an axis substantially parallel with the axis of the guide roller, the movement whereof is synchronized with the rotation movement of the guide roller. The pressure member can comprise cavities of a shape complementary to the embossing protuberances, to deform the material forming the tail of the log. In more efficient embodiments, however, it is preferable to use a pressure member that comprises a yielding surface, preferably elastically yielding, which cooperates with the embossing protuberances to emboss the tail of the log. The tail is embossed, i.e. subjected to permanent deformation that creates relief protrusions corresponding to the embossing protuberances, as a result of penetration of the protuberances into the yielding material of the pressure member.

In some embodiments the retaining elements comprise suction members. Said suction members can be arranged to retain the tail on the embossing protuberances of the guide roller, for example forming one or more lines of suction holes, openings or slits on the guide roller.

In some embodiments the gluing member comprises a gluing roller rotating about an axis substantially parallel to the axis of rotation of the guide roller. The gluing roller can be a cliché roller, which cooperates with a glue distribution system, for example comprising an anilox roller, or other system suitable for the purpose. In advantageous embodiments it can be provided that the gluing roller or cliché roller rotates continuously and always in the same direction, in this way simplifying the glue distribution mechanism, also reducing stresses and vibrations on the components of the device.

In some embodiments a gluing roller can be provided, for example a cliché roller, rotating about an axis substantially parallel to the axis of rotation of the guide roller at a peripheral speed substantially equal to the peripheral speed of the embossing protuberances of the guide roller, at least during the step in which the gluing roller is in contact with the tail of the log to be glued, which is retained on the guide roller.

In some embodiments the gluing roller comprises a substantially cylindrical, homogeneous, machined peripheral surface to transfer said glue from a glue source to embossed surfaces of the tail of the log. The gluing roller can be provided with a cliché, if necessary interchangeable, made of synthetic, metallic or other material, which can receive and transfer the glue. In some embodiments the glue is distributed on the gluing roller with a doctor blade system. Preferably, in other embodiments the glue is distributed on the gluing roller by means of an anilox roller. An anilox roller is a roller having on the surface thereof a distribution of microcavities, for example produced by laser etching, the shape, dimension and distribution of which is determined as a function of the quantity of glue required. The anilox roller can pick up the glue from a tank and if necessary can cooperate with one or more doctor blades.

The anilox roller, or other glue pick-up roller, can advantageously be provided with a continuous motion, at substantially constant speed, without the need to reverse the motion.

In general, the glue application member, i.e. the gluing roller, for example the cliché roller, does not require having protrusions or relief parts to apply the glue according to a pattern. In fact, distribution of the glue according to a pattern is obtained as a result of the embossing performed on the web material forming the tail of the log and therefore the glue application member can be substantially smooth.

In some embodiments the gluing roller is provided with a movement towards and away from the guide roller, to alternately take an idle position, at a distance from the guide roller, and an active position, to apply the glue to the tail retained on the guide roller.

In some embodiments the guide roller is controlled to perform a first rotation in an unwinding direction, to convey the tail of the log toward the embossing members and the gluing member, and a second rotation in the opposite direction, to rewind the tail of the log. Advantageously, in possible embodiments it can be provided that during the first rotation the guide roller cooperates with the embossing members to emboss the tail of the log, and during the second rotation said guide roller cooperates with the gluing member to apply the glue to embossing protrusions formed on the tail of the log.

In practical embodiments the pressure member and the gluing member are arranged in sequence around the guide roller, the pressure member being positioned downstream of the gluing member with respect to the direction of advance of the tail of the log during said first rotation of the guide roller. Reverse arrangements are also possible, with the pressure member positioned upstream of the gluing member with respect to the direction of advance of the tail during the first rotation of the guide roller.

In possible embodiments the gluing member is controlled in such a manner as to be in a first position at a distance from the guide roller during the first rotation and to take a second position moving against the guide roller during at least part of the second rotation.

Advantageously, to obtain greater flexibility of the log tail gluing device, it can be provided that the embossing members are interchangeable. For example, when the embossing members comprise embossing protuberances carried by the guide roller, it can be provided that these embossing protuberances are interchangeable. This can be obtained, for example, by providing that the embossing protuberances are formed on a block, dowel or insert attachable to the guide roller in a reversible manner, for example in a seat. Several dowels, blocks or inserts can also be provided, which are aligned with one another along the longitudinal extension of the guide roller.

In advantageous embodiments, the device comprises a positioning station of the tail of the logs and a gluing station, distinct from each other. The two stations can be suitably spaced apart from one another. There can also be provided members for rotation, unwinding and rewinding of the logs, which allow one log to be handled in the positioning station while another log is being handled in the gluing station. This allows an increase in the productivity of the gluing device.

Between the positioning station and the gluing station transfer members can be provided, for example comprising one or more flexible members, such as belts or the like, and if necessary suction systems for retaining the tail.

In some embodiments, the device comprises a log feed surface, for example a suction surface, or a rolling surface. Belts for moving the log can be positioned along the feed surface, between the positioning station and the gluing station.

In the positioning station and/or along the log feed path, between the one and the other of the stations of the device tail detecting sensor can be provided, for positioning the tail.

According to a further aspect, the invention relates to a method for gluing the tail of a log of web material, comprising the steps of:

identifying the tail of the log to be glued;
unwinding the tail;
embossing the tail forming thereon embossing protrusions;
applying a glue to the embossing protrusions;
rewinding the tail and gluing the tail to the outer surface of the log.

The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The present invention will be better understood by following the description and accompanying drawing, which shows a non-limiting practical embodiment of the invention. More in particular, in the drawing:

FIG. 8A shows an enlargement of the area where glue is applied to the embossed tail;

FIGS. 16 to 19 show an operating sequence of a device according to the invention in a third embodiment.

DETAILED DESCRIPTION OF EMBODIMENTS OF THE INVENTION

Figure 1:
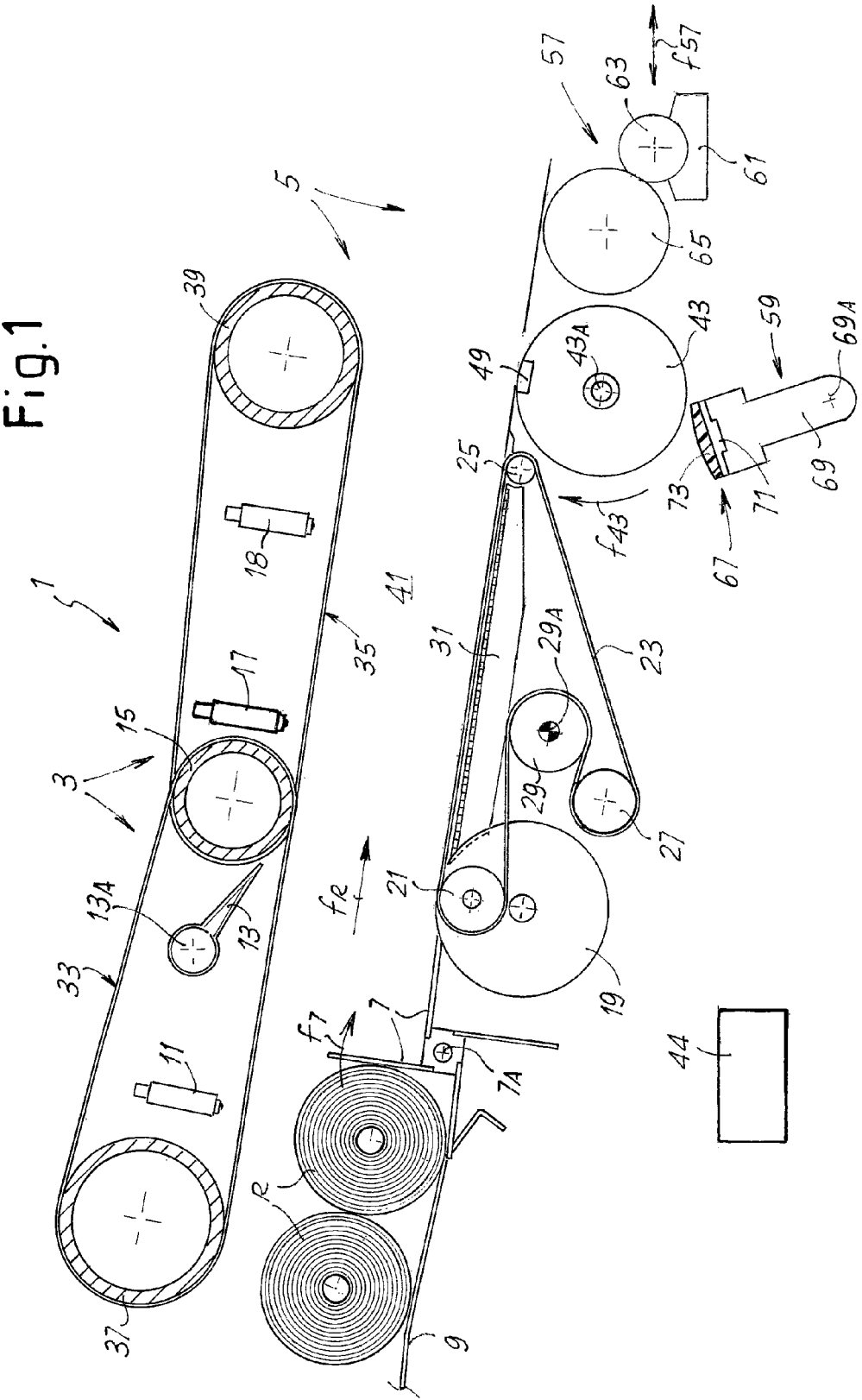
FIGS. 1-9 show a first embodiment of a device according to the invention and the related operating sequence.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

With initial reference to FIGS. 1 to 9, a first embodiment of the device and of the method of the present invention will be described. The figures show an operating sequence of the gluing device with reference to a single log. Several logs can be located simultaneously in the device in various positions or work stations.

The device, indicated as a whole with 1, comprises a positioning station 3 of the tail of each log R to be glued. A gluing station 5 is located downstream of the positioning station 3. In the embodiment illustrated the gluing station 5 is positioned at a certain distance with respect to the tail positioning station 3.

A revolving distributor 7 can be arranged in the positioning station 3. In the embodiment illustrated the distributor 7 is a "butterfly" distributor, rotating about an axis of rotation 7A.

Upstream of the distributor 7 there can be positioned a slide 9, on which logs R to be glued, coming from a machine, device or station upstream of the gluing device 1, accumulate.

The gluing device 1 can be positioned downstream of a rewinding machine, or downstream of an accumulator for logs delivered from a rewinding machine, or in any other suitable position of a converting line for web material, for example a tissue paper.

The revolving distributor 7 rotates according to arrow f7, to transfer one log R at a time toward the tail positioning station 3 and toward the transfer members that transfer the log, the tail of which has been identified and positioned, toward the gluing station 5.

A photocell 11 can verify the presence of at least one log R in the revolving distributor 7, to enable the gluing cycle of the gluing device 1.

Various systems, devices and machines are known in the art to identify the tail of the log to be glued and position it appropriately. Hereinafter a possible system of members to carry out this operation will be described, it being understood that the concepts on which the invention is based can also be embodied in gluing devices having other types of members for identifying and positioning the tail of the logs.

In the illustrated embodiment, a plurality of blower nozzles 13 is arranged in the positioning station 3. In FIGS. 1 to 9 a single nozzle 13 is visible, it being understood that these are aligned in transverse direction, i.e. according to a direction orthogonal to the plane of FIGS. 1 to 9.

In the embodiment illustrated, the reference 13A indicates a duct for feeding pressurized air to the nozzles 13. In the embodiment illustrated, the nozzles 13 are positioned upstream of a entraining roller 15, guided around which are flexible members for movement of the logs, described hereinafter. The entraining roller 15 is advantageously constituted by a plurality of rollers or pulleys coaxial with one another aligned along the axial direction, suitably spaced apart to allow insertion of the ends of the nozzles 13. With the roller or rollers 15 one or more photocells 17 are also associated, which are positioned downstream of the entraining roller 15, to identify the tail of the log R, which at each cycle is positioned in the tail positioning station 3. In some embodiments, a second photocell or series of photocells 18 is positioned downstream of the photocells 17.

Below the roller 15 or the series of rollers 15 a further roller 19 is arranged, also constituted alternatively by a single roller, or by a plurality of rollers, pulleys or wheels coaxial with one another and aligned along the transverse direction of the gluing device 1.

In some embodiments the roller 19 is formed by a plurality of wheels or pulleys distanced from one another, preferably fitted on a common shaft and between which empty spaces are available, in which the entraining rollers, wheels or pulleys 21 of a flexible member 23 are positioned. Preferably, the axis of rotation of the roller 19 is positioned slightly moved back with respect to the axis of rotation of the return pulley 21, for the purposes that will become more apparent hereinafter.

The flexible member 23 can be constituted by a plurality of belts, each of which is guided around a respective pulley 21 intercalated between two consecutive rollers or pulleys forming the roller indicated as a whole with 19. Each belt 23 is guided, around the pulley 21 as well as around a second pulley 25, a third pulley 27 and a fourth pulley 29. In practice, the pulleys 25, the pulleys 27 and the pulleys 29 respectively are aligned on respective transverse axes, so as to actually have an assembly constituted by a flexible member 23 formed by multiple belts parallel with one another, guided around rollers each formed by a plurality of corresponding pulleys 25, 27 and 29, respectively, as well as around the pulleys 21. One of the pulleys of each belt forming the flexible member 23 is motorized. In the example illustrated, the supporting shaft of the pulleys 29 is motorized.

The flexible member 23 has an active upper branch that extends between the series of pulleys 21 and the series of pulleys 25. This active branch slides on the flat surface of a vacuum box 31, the purpose of which will be explained hereinafter.

Above the pulleys 21, 25, the roller 19 and the flexible member 23, a further assembly of belts forming two flexible members extends, indicated as a whole with 33 and 35. More in particular, the flexible member 33 is formed by a plurality of belts parallel with one another and guided around the roller 15 (i.e. around the coaxial wheels, rollers or pulleys that form the roller 15) and around a further roller 37, which in turn can be formed by a plurality of coaxial wheels, rollers or pulleys.

The flexible member 35 is formed by a plurality of belts parallel with one another guided around the roller 15, i.e. the pulleys, wheels or rollers forming this latter, as well as around a further roller 39, which is located near the gluing station 5 and which can also be formed in turn by coaxial rollers, wheels or pulleys.

Between the lower branch of the flexible member 33 and the flexible member 35 and the upper branch of the flexible member 23 a feed path 41 of the logs R to be glued is defined, which logs advance along said path according to the arrow fR in a controlled manner, as will be explained hereinafter.

In the gluing station 5, for example approximately below the roller 39, a guide roller 43 rotating about an axis 43A is arranged. The direction of rotation of the guide roller 43 is controlled as a function of the various steps of the gluing cycle, as will be explained hereinafter. A control unit schematically shown at 44 (indicated schematically only in FIG. 1) controls the rotation movement of the guide roller 43 and also the movement of the remaining members of the gluing device 1 to carry out the cycle that will be described in greater detail hereinafter with reference to the sequence of FIGS. 1 to 9.

As illustrated in the drawing, in this exemplary embodiment the guide roller 43 is positioned downstream of the vacuum box 31.

Figure 10:
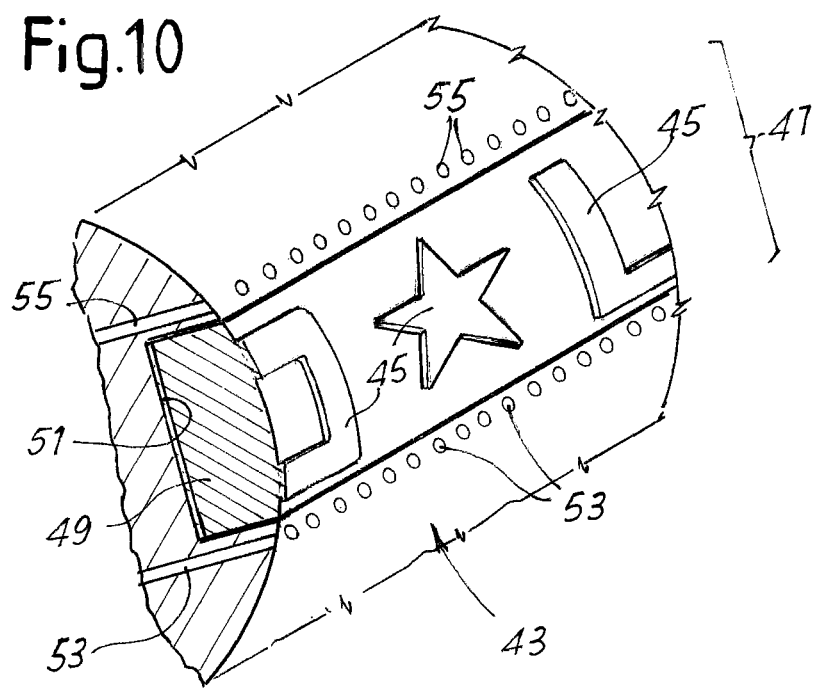
FIG. 10 shows a detail of the embossing area of the guide roller in a sectional view and in a perspective view.

Advantageously, in some embodiments the guide roller 43 has an area provided with embossing protuberances 45, shown in particular in FIG. 10. In some embodiments the protuberances 45 are aligned on a longitudinal strip or band 47 of the guide roller 43. The width of the longitudinal strip or band 47 provided with protuberances is of the order of magnitude of the width of the line of glue to be applied to the tail of the logs.

In some embodiments the protuberances 45 are provided on a removable block 49. The block 49 can, for example, be attached in a longitudinal seat 51 provided in the guide roller 43. The block 49 can advantageously be interchangeable so as to be able to attach to the guide roller 43 blocks 49 having protuberances 45 of different shape, size or arrangement from one another. In some embodiments a block 49 can even simply be provided with one protuberance 45 of rectilinear shape and parallel to the axis of rotation of the roller 43. In this case, gluing to seal the tail takes place according to a straight line parallel with the axis of the log, as in conventional systems.

In some embodiments the guide roller 43 is provided with retaining elements of the tail of the logs R to be glued. In the embodiment illustrated these retaining elements comprise suction holes 53 arranged parallel to the longitudinal strip 47 and on at least one side thereof. It is also possible to provide a second series of suction holes or openings 55 on the opposite side of the longitudinal strip 47. In some embodiments, not shown, suction holes applied along the longitudinal strip 47 can be provided on the inside thereof, instead of on the outside thereof. For example, there can be provided suction holes or openings formed directly in the interchangeable block 49. In other embodiments retaining elements of mechanical type can be provided.

In less advantageous embodiments, not shown, the guide roller 43 could be designed monolithically, with the protuberances 45 formed on the surface of the same roller instead of on a removable block. Also in this case, the suction holes could be located directly in the area provided with protuberances 45 or adjacent thereto.

In other embodiments the suction holes could be distributed on the whole of the circumferential extension of the guide roller 43, instead of only along the longitudinal strip provided with protuberances 45.

Around the roller 43 there are arranged a gluing member or gluing unit 57 and a pressure member 59, which has the function of generating embossing protrusions on the tail of the log R to be glued.

In some embodiments the gluing member 57 comprises a glue tank 61 cooperating with an anilox roller 63, which picks up the glue from the tank 61 and transfers it to a cliché roller 65. The cliché roller 65 can be formed with a continuous or substantially continuous cylindrical surface, constituted by a suitable material which receives the glue from the anilox roller 63 and applies it to embossing protrusions generated on the tail of the log R at the protuberances 45, as will be explained in greater detail hereinafter.

The cliché roller 65 can be provided with a cliché plate carried on the cylindrical surface of the cliché roller 65. In other embodiments the cliché roller 65 can be made of one piece, with an outer surface for applying the glue. When a cliché plate applied to the cliché roller 65 is provided, said plate can have an extension of 360°, or less than 360°.

More in general, the gluing member 57 has a glue source and a pick-up member, in the present case formed by the cliché roller 65, which receives from the source (in the example illustrated formed by the tank 61 and by the anilox roller) the glue and applies it according to a pattern, at the embossing protrusions generated by the protuberances 45 in the manner described below.

The gluing member 57 is provided with a movement toward and away from the guide roller 43 according to f57, for the purposes that will be explained hereinafter. If the cliché roller 65 is provided with a cliché plate with an extension of less than 360°, the movement according to f57 can be omitted.

The glue can advantageously be colored glue.

In some embodiments the pressure member 59 comprises a pressing element 67. In the embodiment illustrated in FIGS. 1 to 9 the pressure member 59 has a rotating arm 69, preferably controlled to carry out rotations in alternate directions through angles of less than 360°. In some embodiments the distal end (i.e. opposite with respect to the axis of rotation 69A) of the arm 69 is provided with a block 71, which can be interchangeable. In some embodiments the block 71 is formed by yielding material, preferably elastically yielding, or can have a coating made of yielding material, preferably elastically yielding, for example natural or synthetic rubber.

In a modified embodiment, shown by way of example hereinafter, with reference to a different embodiment of the gluing device, the pressure member 59 can comprise a rotating roller completely coated with an elastically yielding material.

Having briefly described the structure of the device 1, the operating cycle thereof will now be illustrated with reference to the sequence of FIGS. 1 to 9.

Figure 2:
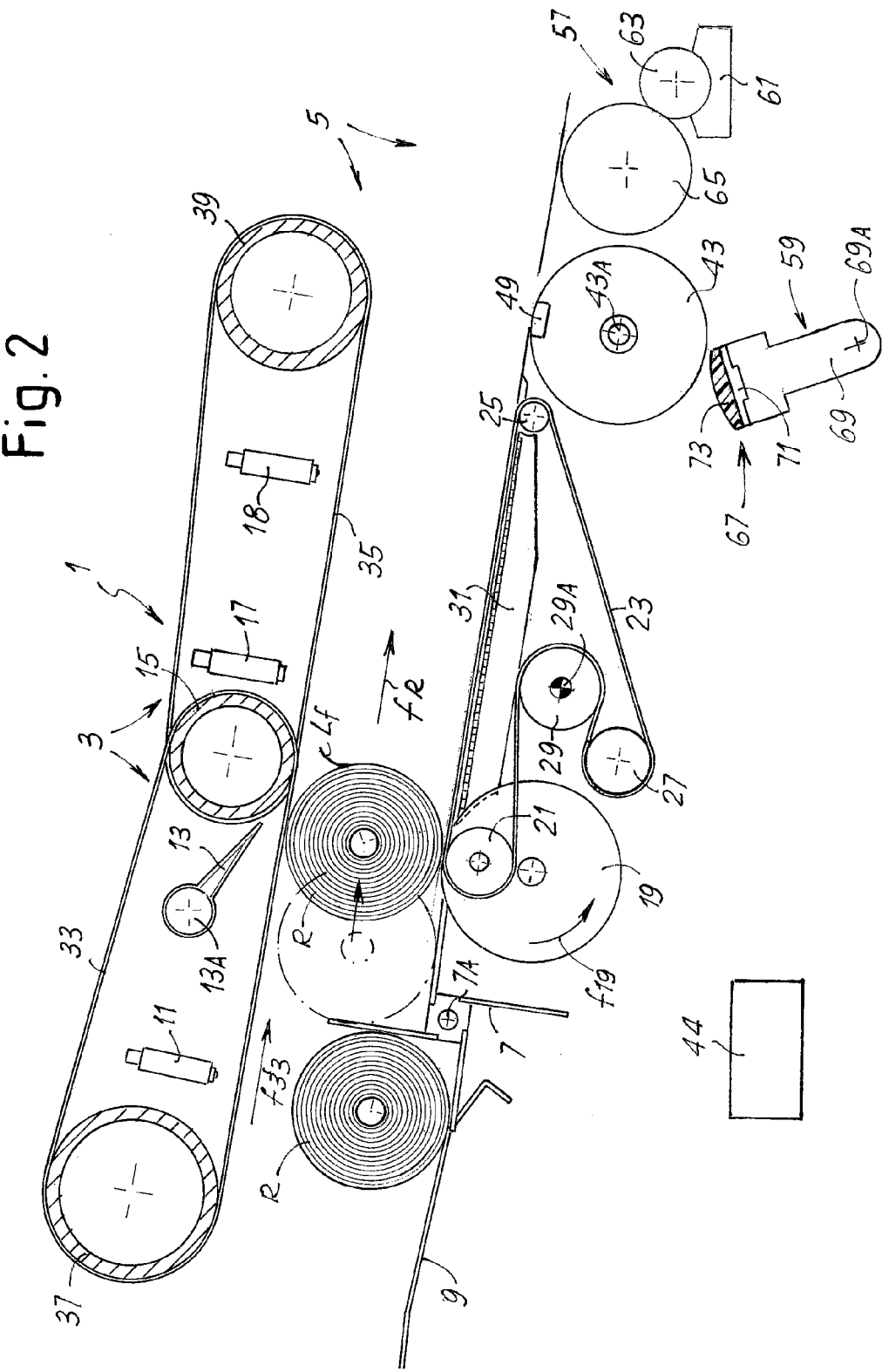
Figure 3:
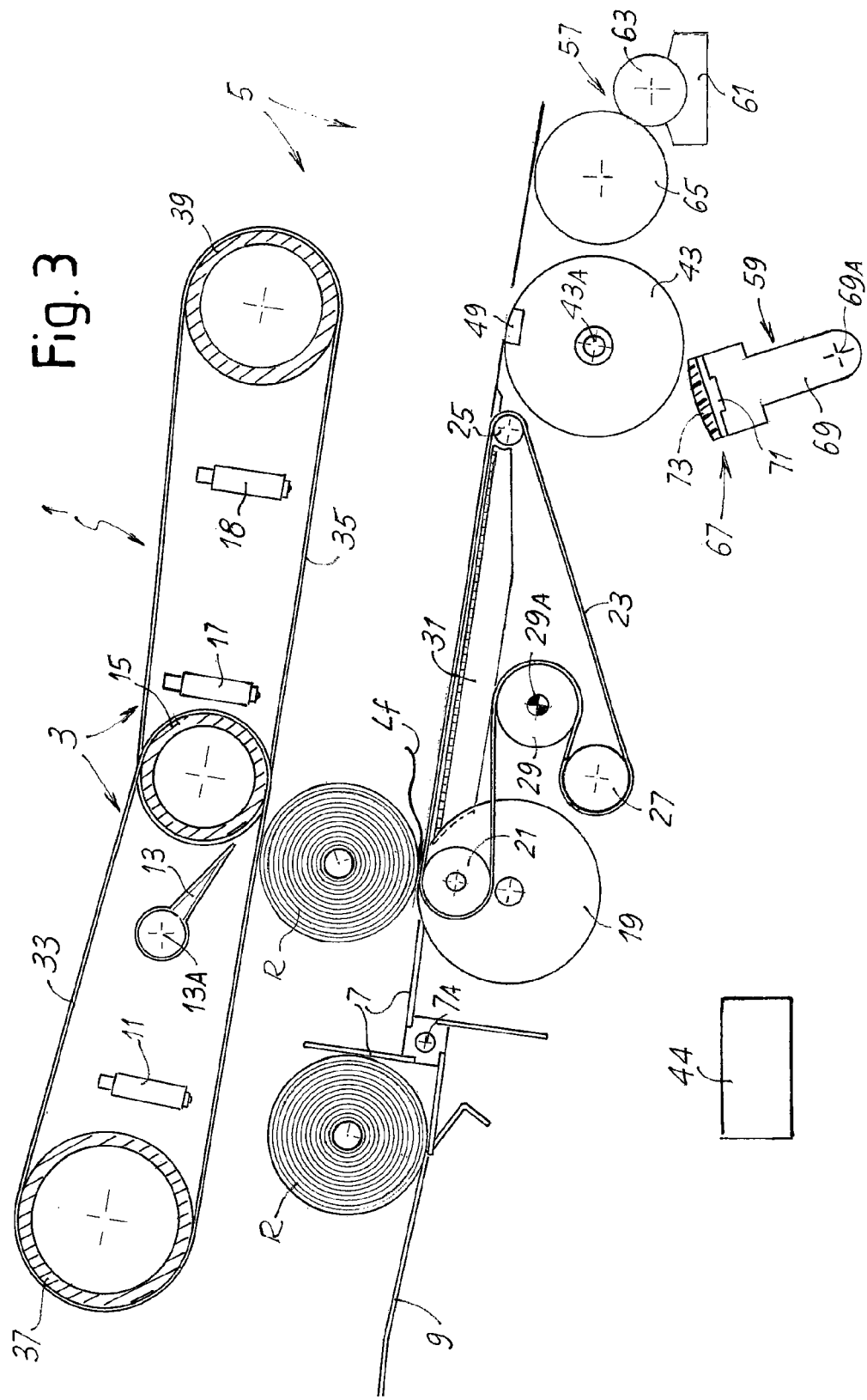
Figure 4:
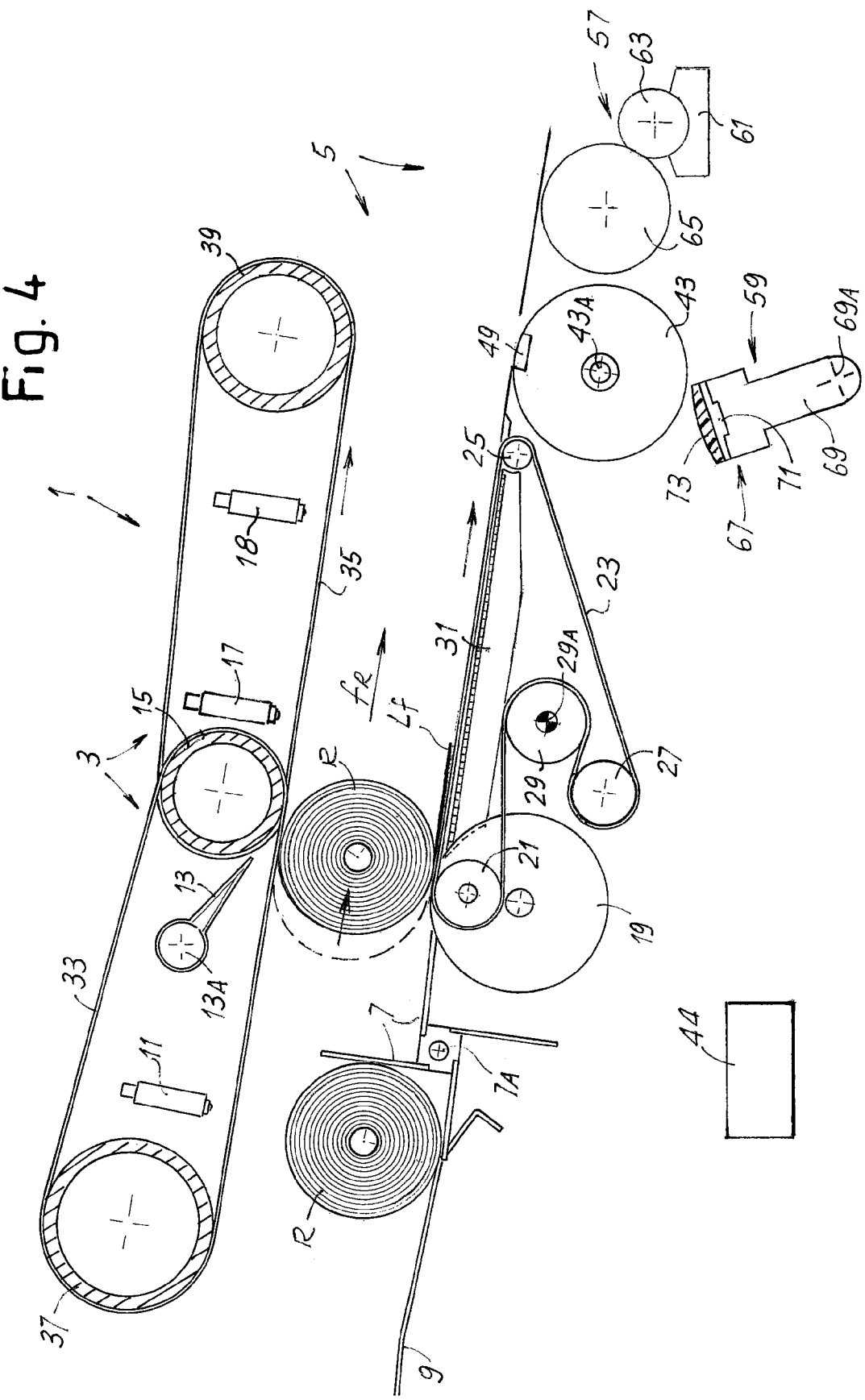
Figure 5:
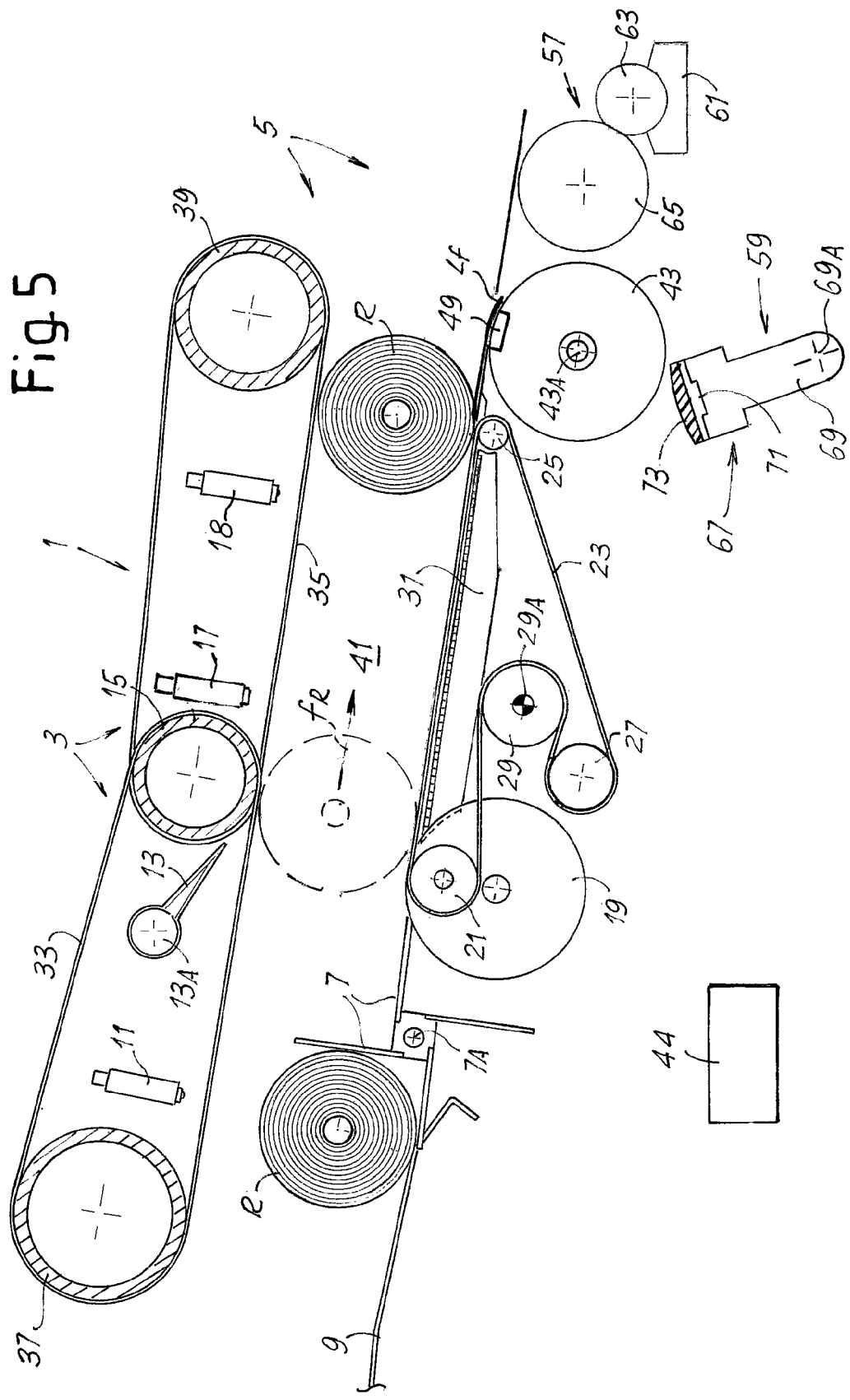
Figure 6:
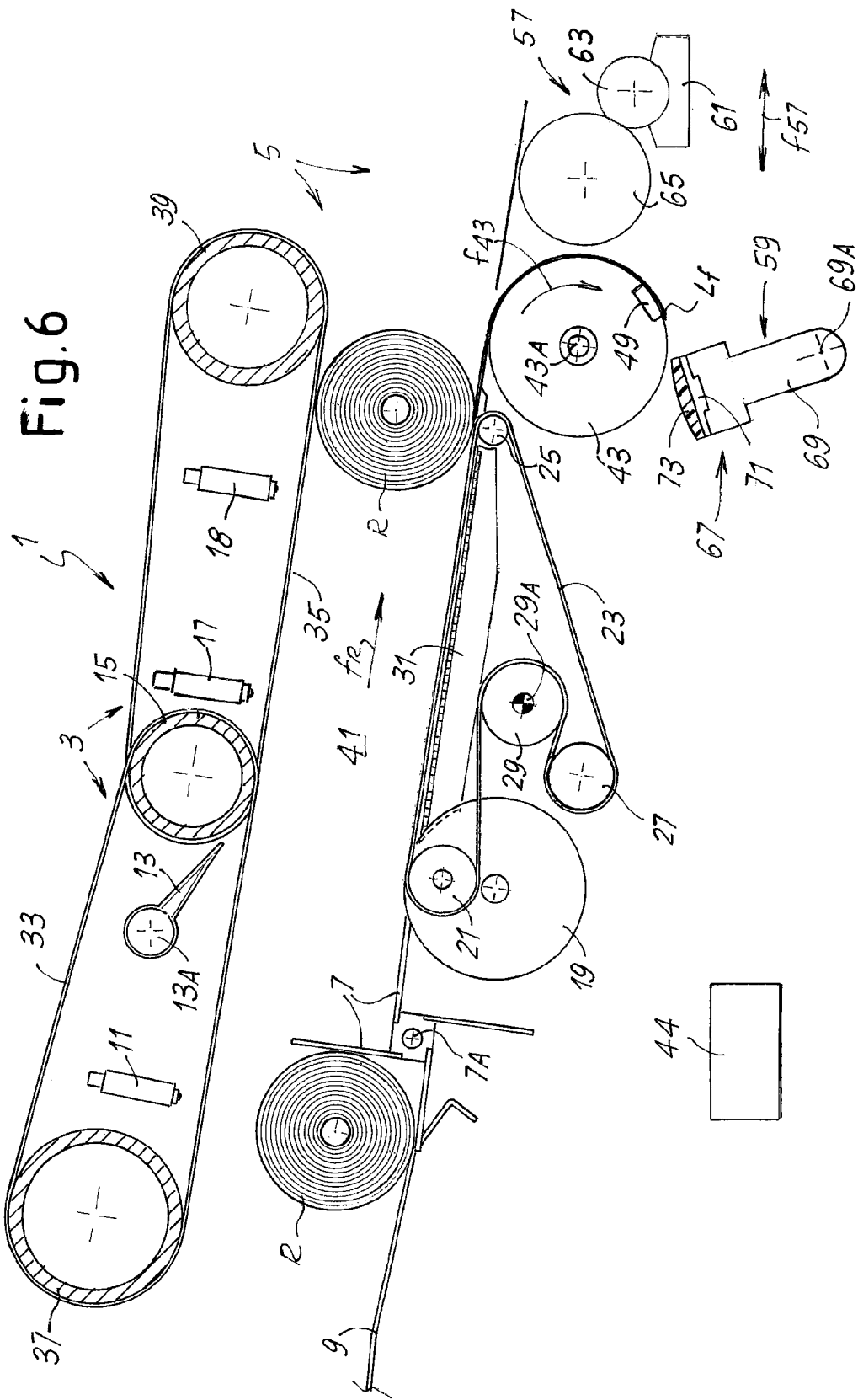

In FIG. 1 a log R to be glued is located in the rotating distributor 7, ready to be inserted into the tail positioning station 3. The distributor 7 rotates according to the arrow f7 to move the log R to the position illustrated in FIG. 2. In this step the flexible member 33 moves according to the arrow f33 at the same speed but in the opposite direction with respect to the peripheral speed of the roller 19 below, which rotates according to the arrow f19 (FIG. 2). In this way the log R is held temporarily in a stationary position, i.e. it does not advance along the path 41 defined between the flexible members 33, 35 and 23, but remains stationary, rotating about the axis thereof, in the winding direction.

As a consequence of this, when the tail Lf of the log R is located in front of the nozzles 13, the air that is blown by these nozzles lifts the tail Lf and lays it on the surface below formed by the vacuum box 31 and by the upper branch of the flexible member 23, as shown schematically in FIG. 2. Continuing rotation of the members 33 and 19, the tail Lf is gradually rewound until it is identified by the photocell 17.

Once the photocell 17 has identified the position of the tail Lf, the rotation movement of the roller 19 is stopped, while the flexible member 33 continues to move so as to make the log R roll forward along the path 41 according to arrow fR. Advancing in this way the log comes into contact with the lower flexible member 23 and continues to advance firstly between the flexible members 33 and 23 and subsequently between the flexible members 23 and 35. The speed of the flexible members 33, 35 and 23 can be varied with respect to one another in such a manner as to impart to the log R a translation movement as well as a rotation movement about the axis thereof, to increase or to decrease the length of the tail Lf unwound from the log. In this advancing movement the vacuum box 31 ensures that the tail Lf of the log R that advances along the path 41, continues to adhere to the feed surface, formed by the belts forming the flexible member 23 and sliding on the vacuum box 31, and is not folded, but advances continuing to adhere to the upper branch of the flexible member 23 until reaching the guide roller 43. The belts forming the flexible member 23 can advantageously be flat belts, if necessary permeable to air, for example perforated, to improve the pneumatic retaining effect of the tail Lf.

To obtain precise positioning of the tail Lf of the log R in order to obtain correct gluing, the second photocell 18 can be used to identify precisely the moment when the tail Lf arrives under the photocell 18. The detection signal of the tail Lf by the photocell 18 allows correct synchronization of the subsequent movements. Advance of the log R with the tail unwound continues in a controlled manner starting from detection of the tail Lf by the photocell 18 until said tail Lf is above the guide roller 43. This instant is determined on the basis of the signal of the photocell 18 and the signal of an encoder associated with one, with the other, or with both the flexible members 23, 35.

The guide roller 43 is positioned in such a manner that the embossing protuberances 45 thereon are positioned in alignment with the surface defined by the upper branch of the flexible member 23 and by the vacuum box 31. In this way, in the gluing step the tail Lf of the log R arrives above the portion of surface of the guide roller 43 provided with the embossing protuberances 45. After reaching this position (FIG. 6) the guide roller 43 starts rotating according to the arrow f43, while the log R continues to advance until it is located between the guide roller 43 and the entraining roller 39 around which the belts forming the upper flexible member 35 are entrained.

In practice, it can also be provided that the guide roller 43 is already rotating before the tail Lf arrives above the guide roller 43. The angular position of the guide roller 43 is controlled in such a manner as to synchronize the position of the embossing protuberances 45 with the position of the tail Lf for the purposes indicated above.

Figure 7:
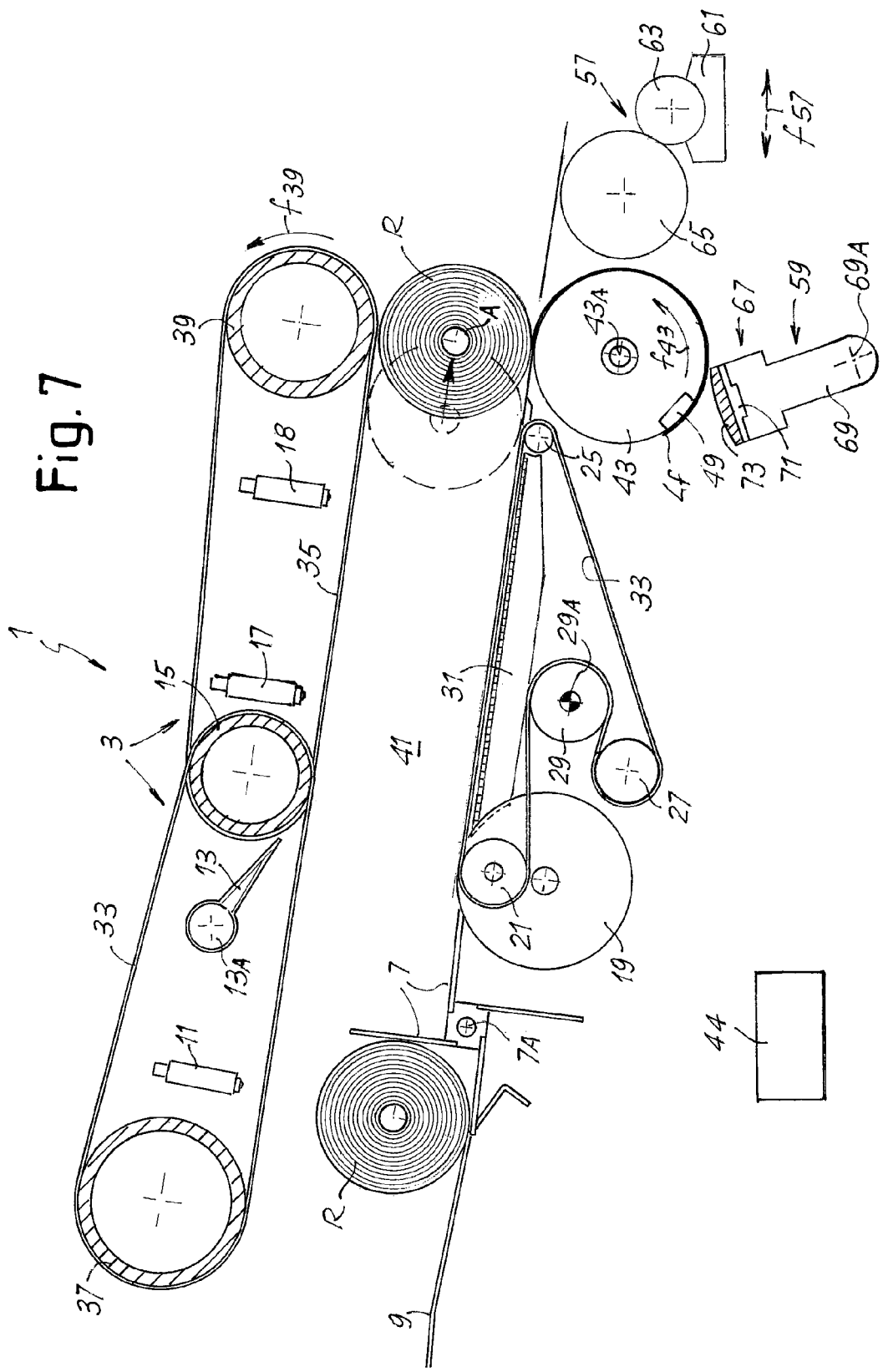

The speeds of the flexible member 35 and of the guide roller 43 are controlled so that the log R continues to advance until reaching the position of FIG. 7. The direction of movement of the members 35, 39, 43 is indicated by the arrows in the drawing and is controlled in such a manner that the log and the tail Lf thereof carry out the movements described hereinafter.

In FIG. 7 the log R has reached the position in the nip between the rollers 43 and 39. Rotation of the guide roller 43 carries the tail Lf gradually downward until passing beyond the position where the pressure member 59 is located. The speed of the flexible member 35 in this step is the same as, but in the opposite direction to, the peripheral speed of the guide roller 43, thus maintaining the axis of the log R in a stationary position.

In this step the gluing member 57 is positioned at a distance with respect to the guide roller 43, so that the cliché roller 65 is not in contact with the web material that is unwound from the log R and continues to adhere to the cylindrical surface of the same guide roller 43.

The pressure member 59 can be positioned in such a manner that it does not interfere with the movement of the guide roller 43.

Figure 8:
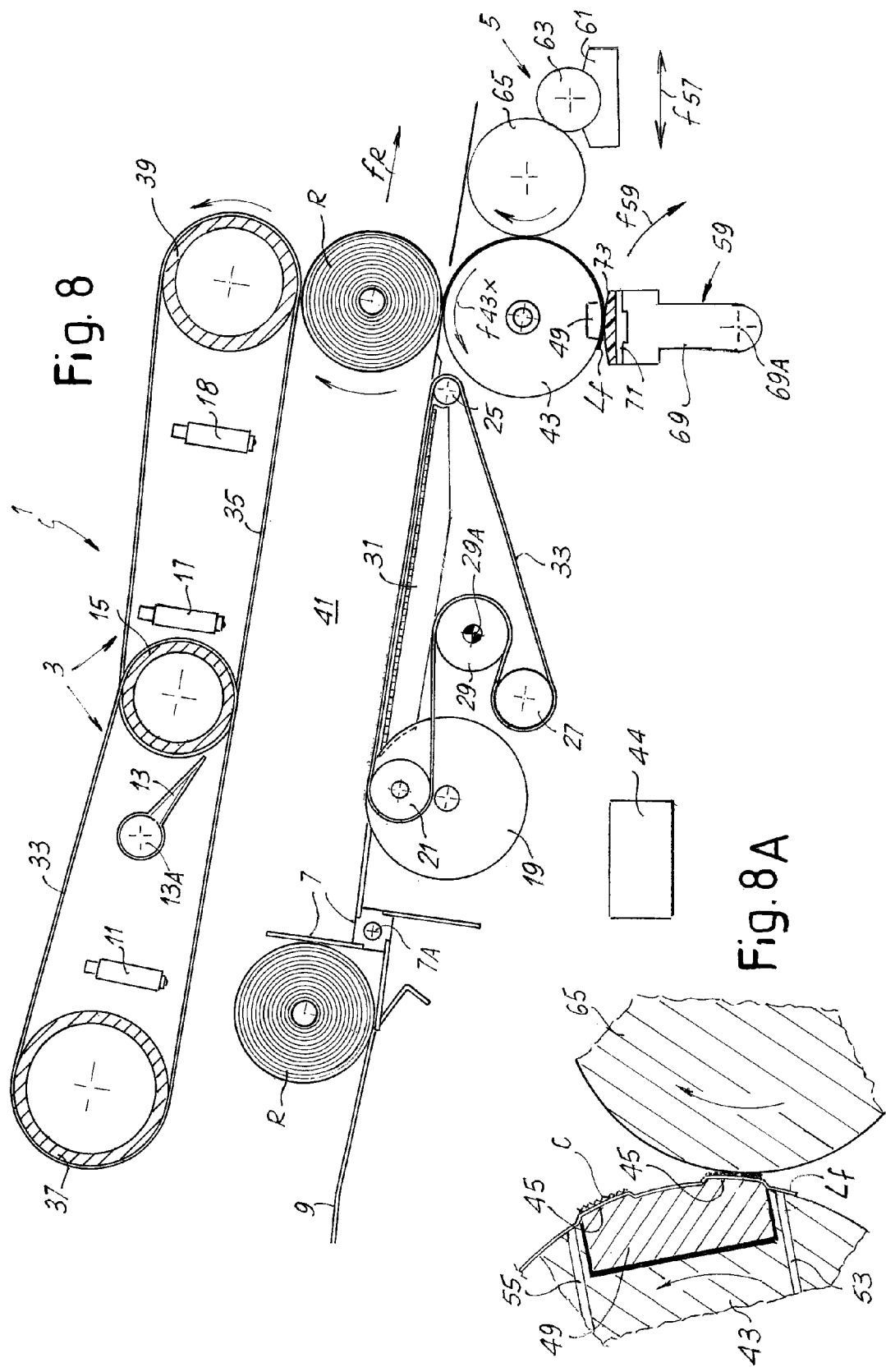
Figure 9:
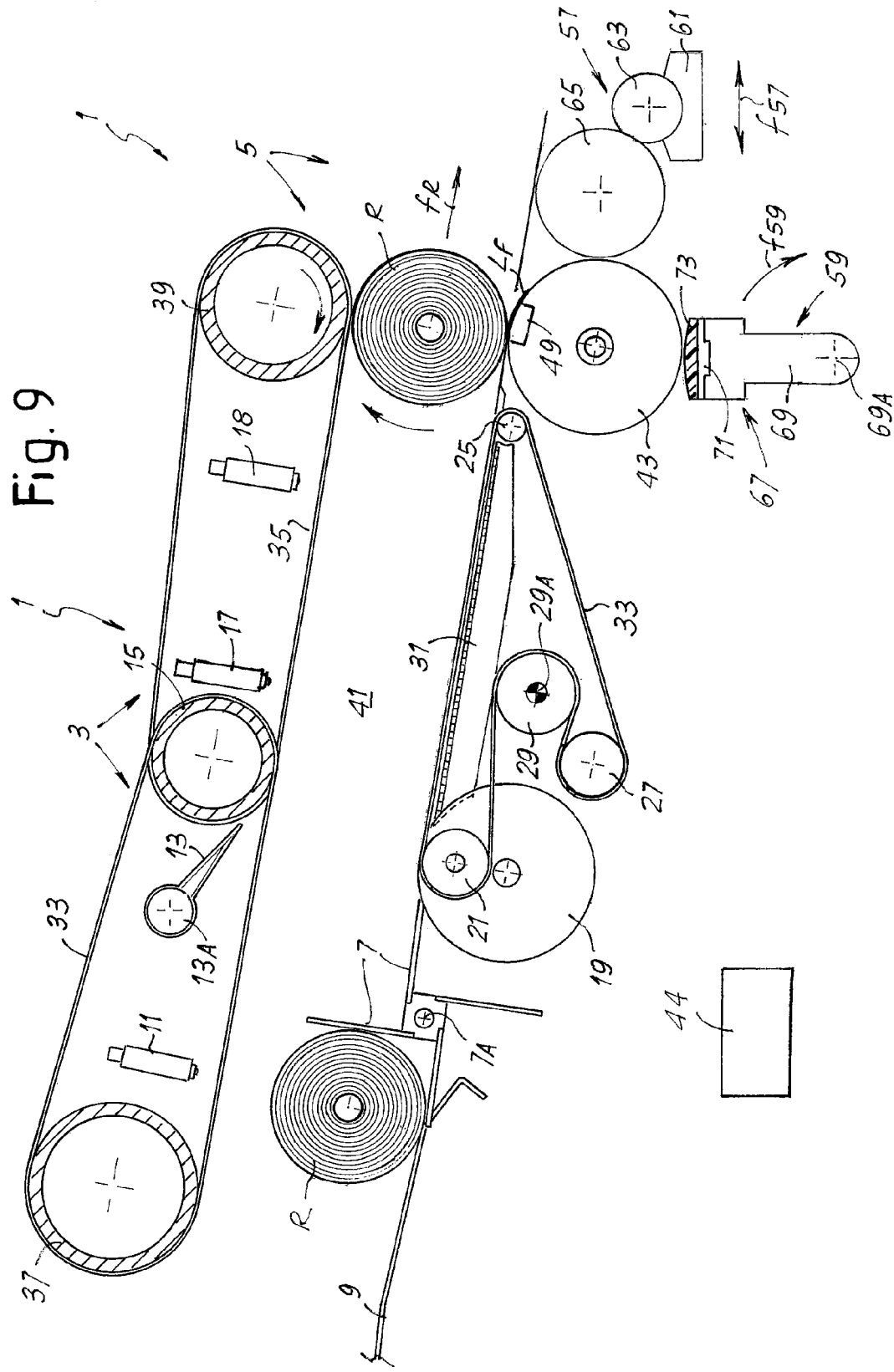

In the subsequent step, shown in FIG. 8, the rotation movement of the guide roller 43 is reversed (see arrow f43x in FIG. 8) and similarly the direction of movement of the roller 39 and of the flexible member 35 is reversed. The rotating arm 69 of the pressure member 59 is carried in rotation according to the arrow f59. The initial angular position of the arm 69 is advantageously such that when the pressure member 59 comes into contact with the tail Lf and/or with the guide roller 43, the relative speed between the guide roller 43 and the pressure member is equal to zero.

The pressure member 59, rotating according to the arrow f59 in the same direction, and preferably with the same peripheral speed with respect to the guide roller 43, ensures that the tail Lf of the log R is pressed between the guide roller 43 and the elastically yielding coating 73 of the pressure member 59. The protuberances 45 of the guide roller 43 penetrate the elastically yielding coating 73 of the pressure member 59, thus embossing the portion of web material forming the tail of the log R. The tail Lf continues to be retained on the cylindrical surface of the guide roller 43 by suction through the suction holes 53, 55.

In this step the gluing member 57 is moved according to the arrow f57 (FIG. 8) until the surface of the cliché roller 65 is carried to a distance from the surface of the guide roller 43 equal to or slightly less than the height of the embossing protuberances 45. In practice the position of the cliché roller 65 in this step is such that it does not touch the web material guided around the guide roller 43 except at the protuberances 45 which project with respect to the cylindrical base surface of the guide roller 43. If the surface of the cliché roller 65 is discontinuous, and has an area with a smaller diameter, instead of the gluing member 57 translating according to f57 to move toward and away from the surface of the guide roller 43, the angular position of the cliché roller 65 can be phased so that when it must not touch the web material adhering to the guide roller 43, the area of smaller diameter of the cliché roller 65 is facing the guide roller 43.

Continuing the rotation of the guide roller 43, the embossed part of the tail LF of the log R passes through the nip defined between the guide roller 43 and the cliché roller 65 of the gluing member 57. As a result of the mutual distance between these two rollers, as defined above, the glue present on the preferably smooth cylindrical surface of the cliché roller 65 is transferred to the embossing protrusions S formed on the tail Lf of the web material of the log R, as can be seen in the schematic enlargement of FIG. 8A. The glue applied by the cliché roller 65 is indicated with C.

In the subsequent step (FIG. 9) rotation of the guide roller 43 and of the flexible member 35 above have caused a rotation of the log R about the axis of this latter (which remains substantially stationary), so as to completely rewind the detached tail Lf on the log R. In this way the tail Lf adheres to the cylindrical outer surface of the log R.

The log R thus glued can be ejected from the gluing device 1. Ejection of the log R from the gluing station 5 takes place by modifying the speed of the flexible member 35 and of the guide roller 43 with respect to one another. For example, this latter can be stopped, while the rotation speed of the roller 39 and therefore the movement of the flexible member 35 are reversed.

Figure 10A:
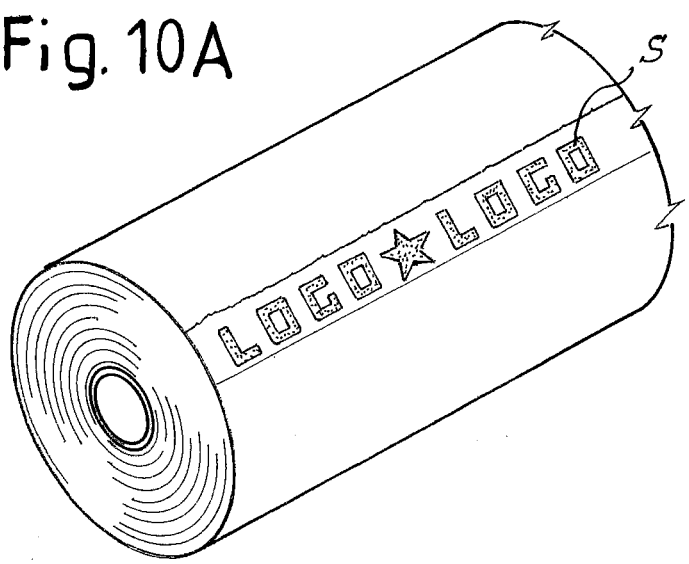
FIG. 10A shows a schematic perspective view of a log with the tail glued thereon.

At the end of the process the log R will be glued with glue distributed according to a pattern, which reproduces the pattern of the protuberances 45. Better visibility and decorative effect of gluing can be obtained using colored glue. FIG. 10A schematically shows a portion of a log R with the tail Lf glued by means of a glue C applied according to a generic pattern that reproduces the embossing pattern formed by the embossing protuberances 45.

Figure 11:
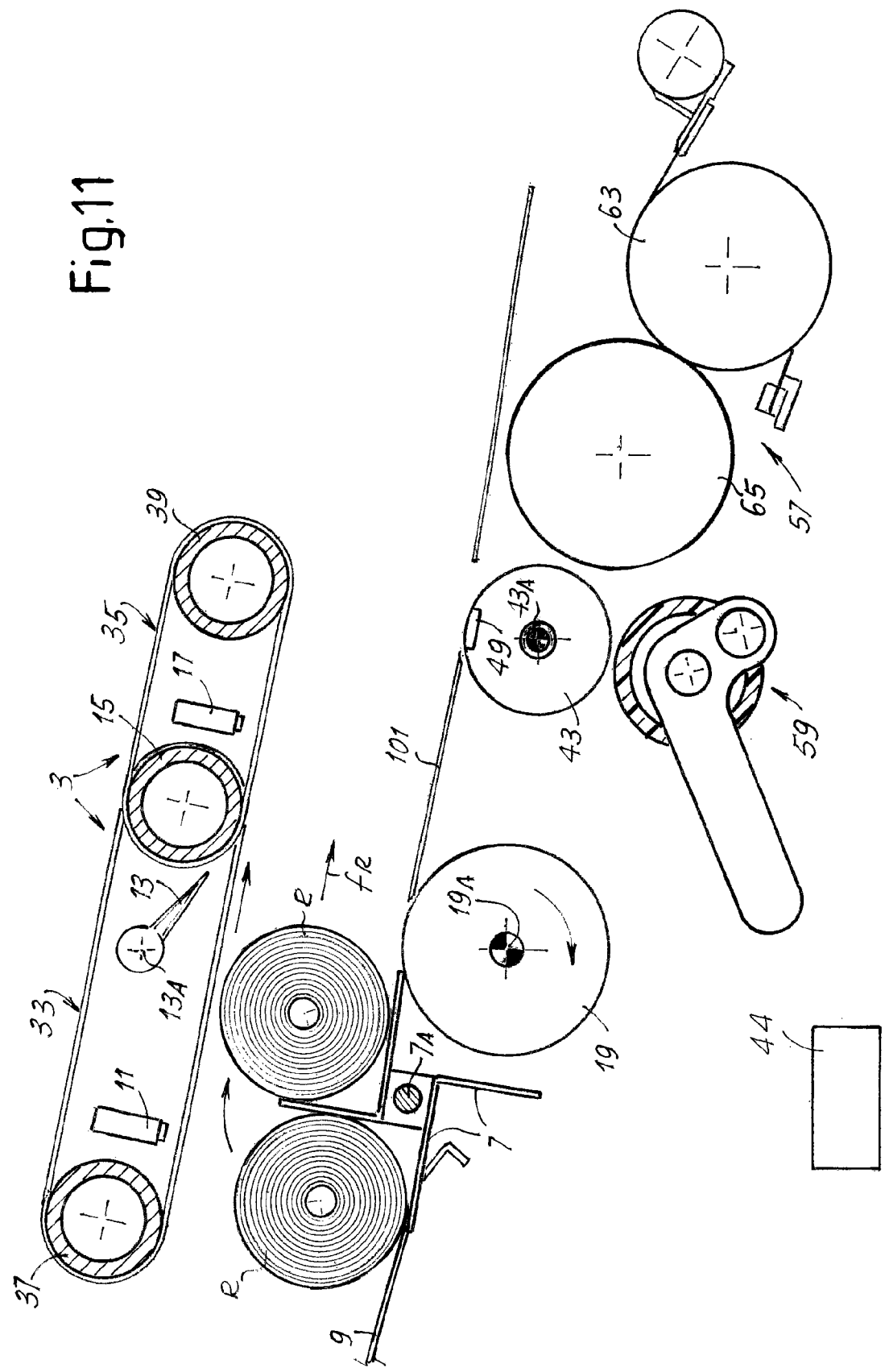
FIGS. 11 to 15 show an operating sequence of a device according to the invention in a second embodiment.
Figure 12:
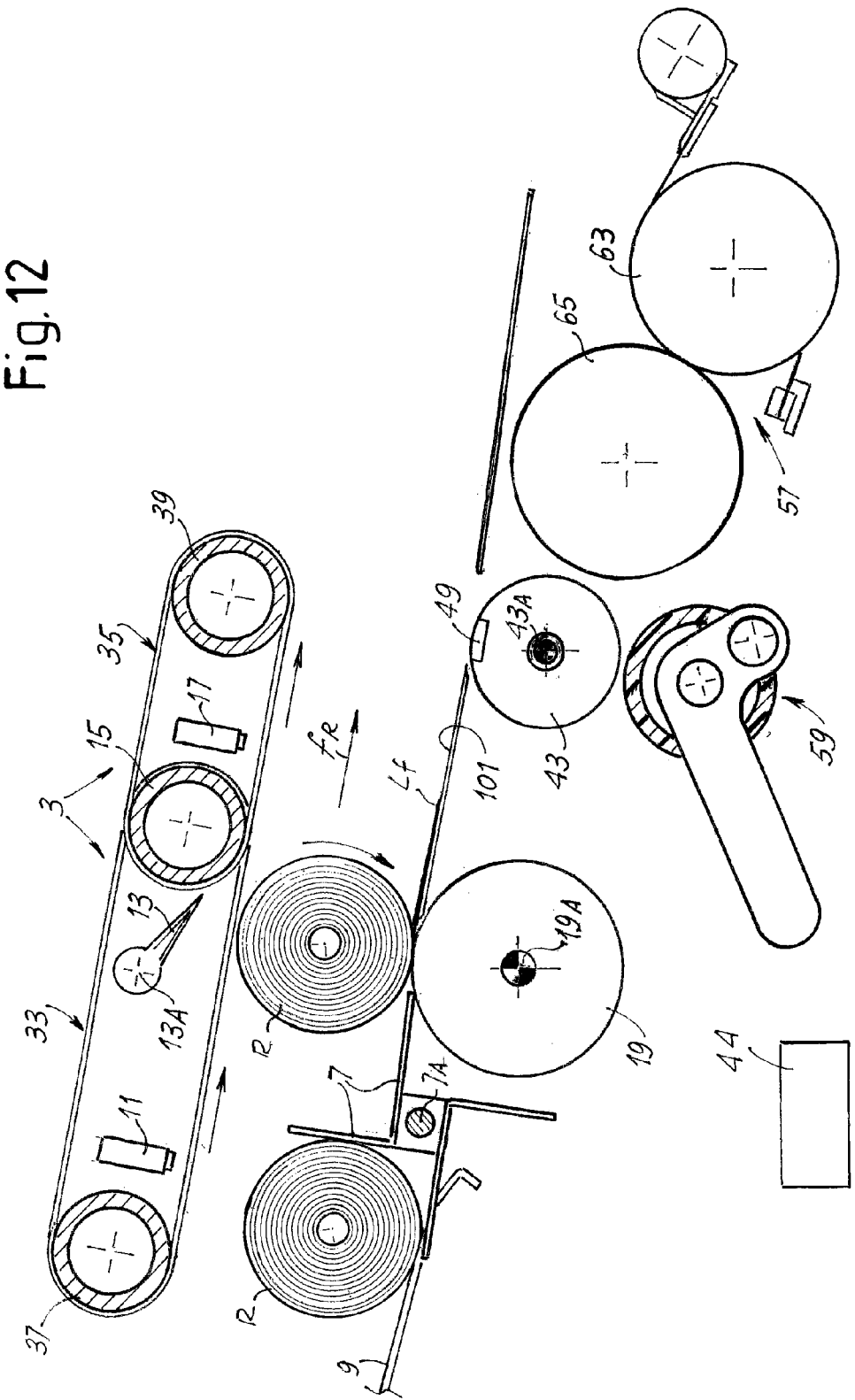
Figure 13:
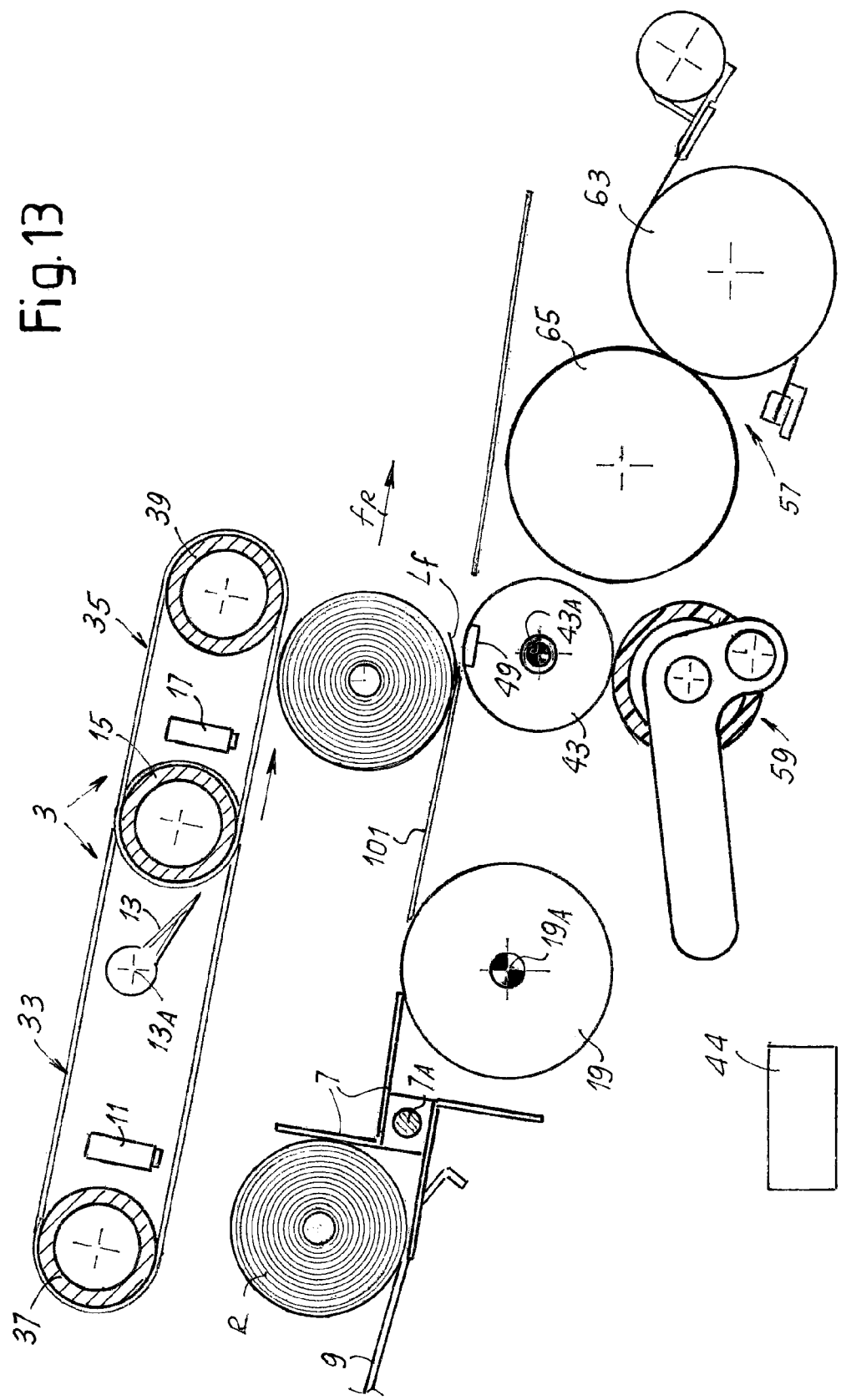
Figure 14:
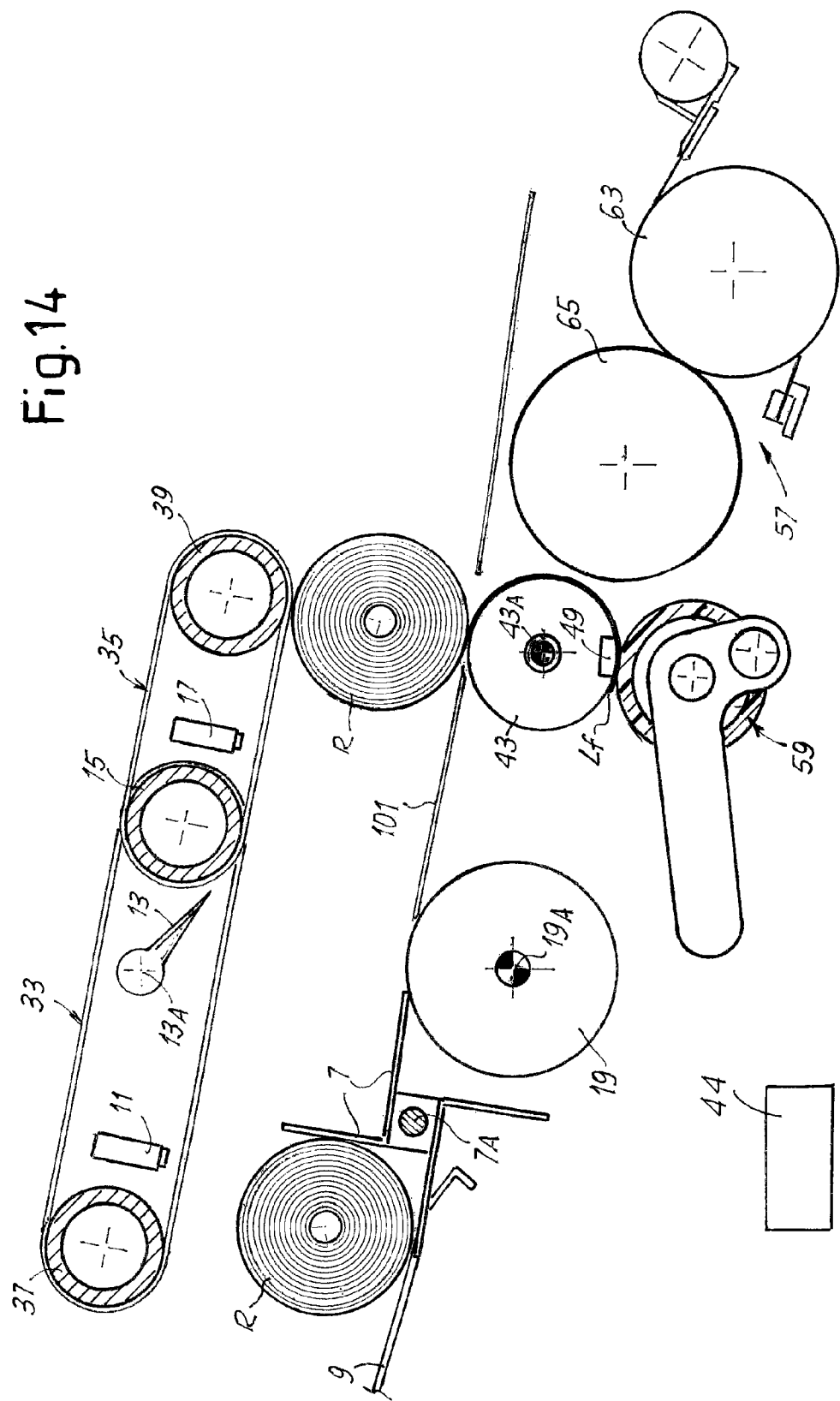
Figure 15:
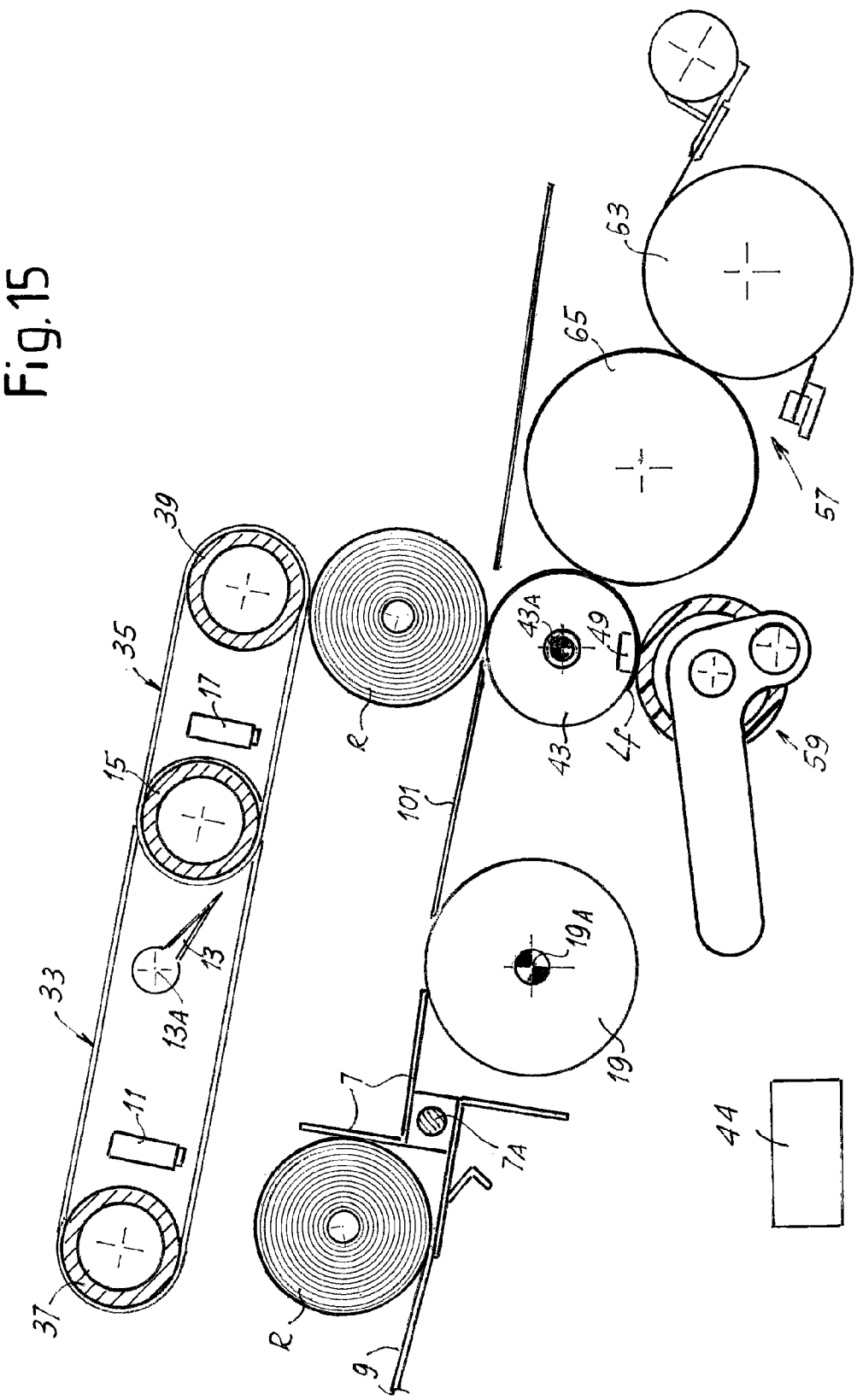

FIGS. 11 to 15 show a modified embodiment of the device 1. The operating cycle is similar to the one described above and will not be described in greater detail. In short: FIG. 11 shows the step of insertion of a log R into the path 41; FIG. 12 shows the step of opening and identifying the tail Lf; FIG. 13 shows the step of transferring the log to the gluing station 5; FIG. 14 shows the embossing step, in which the tail LF is embossed between the guide roller 43 and the pressure member 59, which in this case comprises a rubber-coated pressure roller. Finally, in FIG. 15 the step of rewinding the tail Lf starts, with the cliché roller 65 that has been moved against the guide roller 43 to apply the glue to the embossing protrusions S formed on the tail Lf.

In some embodiments, positioning of the tail Lf and transfer of the log R from the tail positioning station 3 to the gluing position 5 takes place by means of a rolling surface 101, which replaces the lower flexible member 23, and by means of a first upper flexible member 33 and a second upper flexible member 35 substantially designed as described with reference to FIGS. 1 to 9.

In FIG. 12 the tail Lf has been positioned under the photocell 17 and the subsequent transfer movement (FIG. 12-FIG. 13) of the log R to the gluing station 5 is a movement of pure rolling along the surface 101. The position of the tail Lf in FIG. 12 is selected so that when the log R is located in the gluing position in the gluing station 5 (FIG. 13), the tail Lf is located at the protuberances 45 provided on the guide roller 43, which rotates in phase with the rolling advancing movement of the log R.

In this embodiment the tail Lf is correctly positioned with respect to the guide roller 43 and to the block 49 attached thereto by means of the photocell 17. The point in which the photocell 17 identifies the tail Lf and controls start of the controlled rolling movement of the log along the rolling surface 101 is such that the log, which advances by rolling without sliding along the rolling surface 101, arrives with the tail Lf correctly positioned on the guide roller 43 at the block 49, which is temporarily aligned with the rolling surface 101.

FIGS. 16 to 19 show a modified embodiment of the embossing and gluing members, which can be used in combination with the other members of the device of FIGS. 1 to 9 or of the device of FIGS. 11 to 15. The same numbers indicate parts which are the same or equivalent to those described above.

In this embodiment the positions of the pressure member 59 and the gluing member 57 have been exchanged. The pressure member 59 comprises, by way of example, a pressure roller, but can be configured in the same manner as illustrated in FIGS. 1 to 9 as a rotating or oscillating arm.

As can be seen in the sequence of FIGS. 16 to 19, in this case embossing and gluing take place as follows. In FIG. 16 the pressure roller forming the pressure member 59 is pressed against the guide roller 43, which rotates according to arrow f43 to unwind the tail Lf retained at the protuberances 45. Passing through the nip between the rollers 43 and 59 the tail Lf is embossed. In FIG. 17 the tail Lf drawn by the guide roller 43 is carried toward the gluing member 57. The pressure roller 59 is moved away while the gluing roller or cliché roller 65 can be made to abut against the guide roller 43. In other embodiments the gluing unit 57 is again located in the same position and again at a distance such that it only touches the protrusions S of the tail LF embossed by the protuberances 45.

Figure 19:
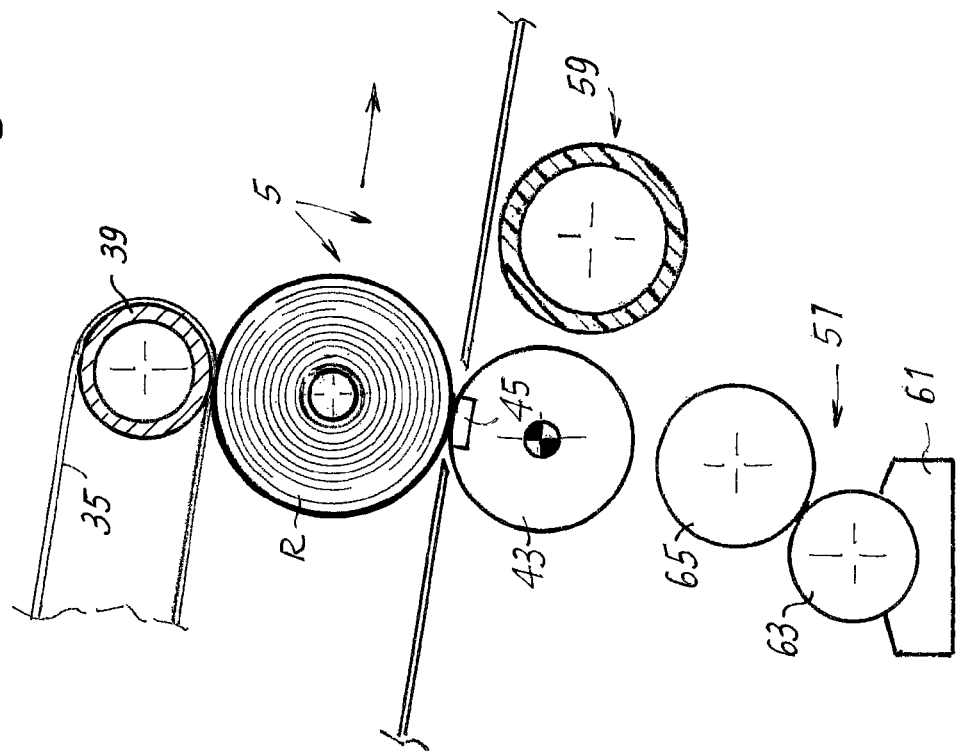
Figure 18:
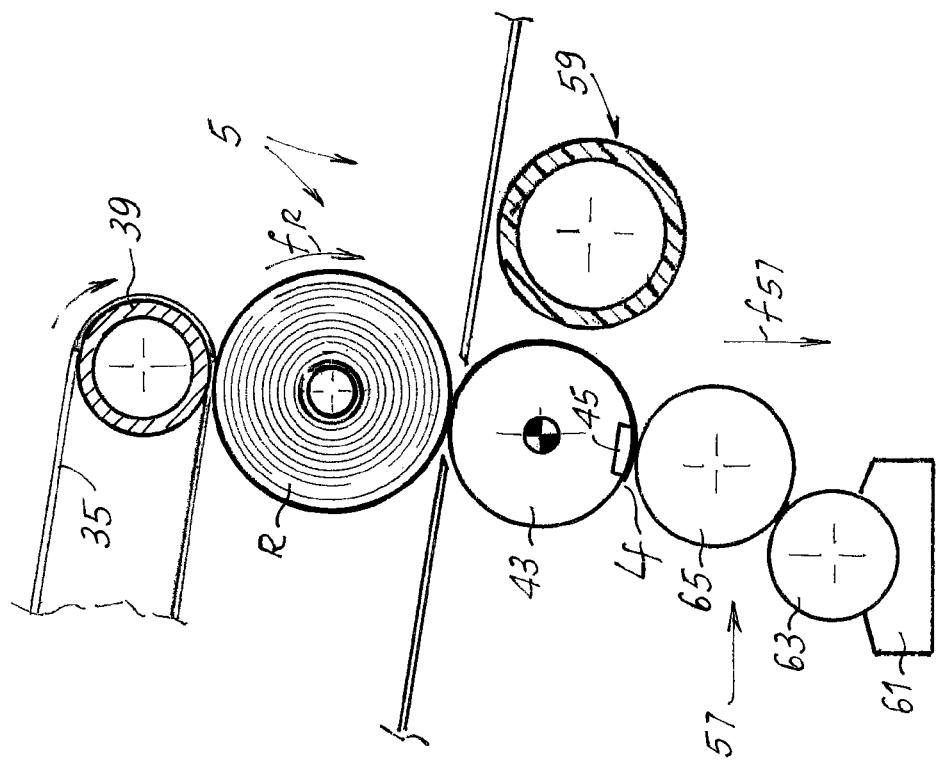

FIG. 18 shows the step of applying glue to the embossing protrusions S, while FIG. 19 shows the step of rewinding the log R. In this step the pressure roller of the pressure member 59 has been moved away from the surface of the guide roller 43 to allow passage of the embossing protrusions provided with glue without touching the roller of the pressure member 59.

Other embodiments are possible. For example in the case of FIGS. 1 to 9 or 11 to 15, the cliché roller 65 can be provided with a cliché plate that has an extension of less than 360° and the rotation of the cliché roller 65 can be phased with the movement of the guide roller 43 so that the tail Lf of the log can pass beyond the cliché roller 65 in the unwinding step without the need to move the gluing member 57. In fact, to prevent interference between the cliché roller 65 and the web material guided around the guide roller 43 it is sufficient, in the step of passage of the tail Lf in front of the cliché roller 65 toward the pressure member 59, for the cliché roller 65 to be positioned angularly with the area without cliché plate (and therefore of smaller diameter) facing the guide roller 43.

A similar arrangement can also be adopted in the embodiment of FIGS. 16 to 19 to prevent, also in this case, movement of the gluing member 57 and guide roller 43 toward and away from each other. Mutual spacing is obtained by means of angular movement of a cliché roller 65, the cliché plate of which has an extension of less than 360°, phasing the movement of the rollers 65 and 43 appropriately.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A gluing device for gluing a tail of a log of web material, comprising:
    a guide roller to guide the tail of the log;
    on said guide roller, retaining elements to engage and retain the tail on the guide roller;
    a gluing member to apply glue to the tail retained on said guide roller;
    embossing members adapted to emboss a portion of the tail of the log before glue is applied, said gluing member being adapted to apply said glue to embossing protrusions formed by said embossing members; and wherein said embossing members comprise embossing protrusions on said guide roller and a pressure member cooperating with said embossing protuberances.

2. The device as claimed in claim 1, wherein said pressure member comprises a pressing element rotating about an axis substantially parallel with an axis of the guide roller, whose movement is synchronized with rotation movement of the guide roller.

3. The device as claimed in claim 1, wherein said pressure member comprises an elastically yielding surface cooperating with the embossing protuberances to emboss the tail of the log.

4. The device as claimed in claim 1, wherein said retaining elements comprise suction members.

5. The device as claimed in claim 1, wherein said retaining elements comprise suction members arranged to retain the tail on the embossing protuberances of the guide roller.

6. The device as claimed in claim 1, wherein said gluing member comprises a gluing roller rotating about an axis substantially parallel to an axis of the guide roller.

7. The device as claimed in claim 6, wherein said gluing roller comprises a substantially cylindrical, homogeneous, machined peripheral surface to transfer said glue from a glue source to embossed surfaces of the tail of the log.

8. The device as claimed in claim 1, wherein said gluing member comprises a gluing roller adapted to rotate about an axis substantially parallel to an axis of rotation of the guide roller, at a peripheral speed substantially equal to peripheral speed of the embossing protuberances of the guide roller, when said gluing roller is in contact with the tail of the log to be glued retained on the guide roller.

9. The device as claimed in claim 1, wherein said guide roller is adapted to perform a first rotation in an unwinding direction, to transfer the tail of the log toward the embossing members and the gluing member, and a second rotation in an opposite direction, to rewind the tail of the log; and wherein during the first rotation said guide roller cooperates with said embossing members to emboss the tail of the log, and during the second rotation said guide roller cooperates with said gluing member to apply glue to the embossing protrusions formed on the tail of the log; and wherein said pressure member and said gluing member are arranged in sequence around the guide roller, the pressure member being positioned downstream of the gluing member with respect to a direction of advance of the tail of the log during said first rotation of the guide roller.

10. The device as claimed in claim 9, wherein said gluing member is arranged so as to be in a first position at a distance from the guide roller during the first rotation and to take a second position abutting against the guide roller during at least part of the second rotation.

11. The device as claimed in claim 1, wherein said embossing members are interchangeable, and wherein said embossing protuberances on the guide roller are interchangeable.

12. A gluing device for gluing a tail of a log of web material, comprising:
a guide roller to guide the tail of the log;
on said guide roller, retaining elements to engage and retain the tail on the guide roller;
a gluing member to apply glue to the tail retained on said guide roller;
embossing members adapted to emboss a portion of the tail of the log before glue is applied, said gluing member being adapted to apply said glue to embossing protrusions formed by said embossing members; wherein said gluing member comprises a gluing roller rotating about an axis substantially parallel to an axis of the guide roller; and wherein said gluing roller is provided with a movement to move against and away from the guide roller, to alternately adopt an idle position, at a distance from the guide roller, and an active position, to apply glue to the tail retained on the guide roller.

13. A gluing device for gluing a tail of a log of web material, comprising:
a guide roller to guide the tail of the log;
on said guide roller, retaining elements to engage and retain the tail on the guide roller;
a gluing member to apply glue to the tail retained on said guide roller;
embossing members adapted to emboss a portion of the tail of the log before glue is applied, said gluing member being adapted to apply said glue to embossing protrusions formed by said embossing members; and wherein said guide roller is adapted to perform a first rotation in an unwinding direction, to transfer the tail of the log toward the embossing members and the gluing member, and a second rotation in an opposite direction, to rewind the tail of the log; and wherein during the first rotation said guide roller cooperates with said embossing members to emboss the tail of the log, and during the second rotation said guide roller cooperates with said gluing member to apply glue to the embossing protrusions formed on the tail of the log.

14. The device as claimed in claim 13, wherein said retaining elements are adapted to retain the tail of the log on a surface of the guide roller, both during the first rotation and during the second rotation.

* * * * *